United States Patent [19]
Leavitt

[11] Patent Number: 5,604,169
[45] Date of Patent: Feb. 18, 1997

[54] PROCESS FOR PRODUCING MIXED-CATION ZEOLITES

[75] Inventor: Frederick W. Leavitt, Amherst, N.Y.

[73] Assignee: Praxair Technology, Inc., Danbury, Conn.

[21] Appl. No.: 610,017

[22] Filed: Mar. 4, 1996

[51] Int. Cl.$^6$ .................................................. B01J 29/04
[52] U.S. Cl. .................................................. 502/60; 502/79
[58] Field of Search .......................................... 502/60, 79

[56] References Cited

U.S. PATENT DOCUMENTS

| | | | |
|---|---|---|---|
| 3,542,509 | 11/1970 | Fürtig et al. | 502/60 |
| 4,557,736 | 12/1985 | Sircar et al. | 55/62 |
| 4,859,217 | 8/1989 | Chao | 55/68 |
| 5,152,813 | 10/1992 | Coe et al. | 55/26 |
| 5,174,979 | 12/1992 | Chao et al. | 423/715 |
| 5,258,058 | 11/1993 | Coe et al. | 95/95 |
| 5,268,023 | 12/1993 | Kirner | 95/103 |

FOREIGN PATENT DOCUMENTS 229391  11/1985  Germany .................................. 502/64

OTHER PUBLICATIONS

"Lithium Zeolites Enhance Nitrogen Separation by PSA", Process Engineering, 70 #5, p. 22, 1989 (no month).

*Primary Examiner*—Michael Lewis
*Assistant Examiner*—Thomas G. Dunn, Jr.
*Attorney, Agent, or Firm*—Robert J. Follett

[57] ABSTRACT

Zeolites containing mixed cations are conveniently prepared by saturating the zeolites with the less strongly held cation, and then injecting the more strongly held cations in a pulse in a recirculating brine solution containing the less strongly held cation. The more strongly held cation is thus exchanged with the less readily held cation on the surface of the zeolite, after which the particles are allowed to equilibrate, with the distribution of the cations within the particles approaching an equilibrium value.

10 Claims, 2 Drawing Sheets

Fig. 1C   Fig. 1D

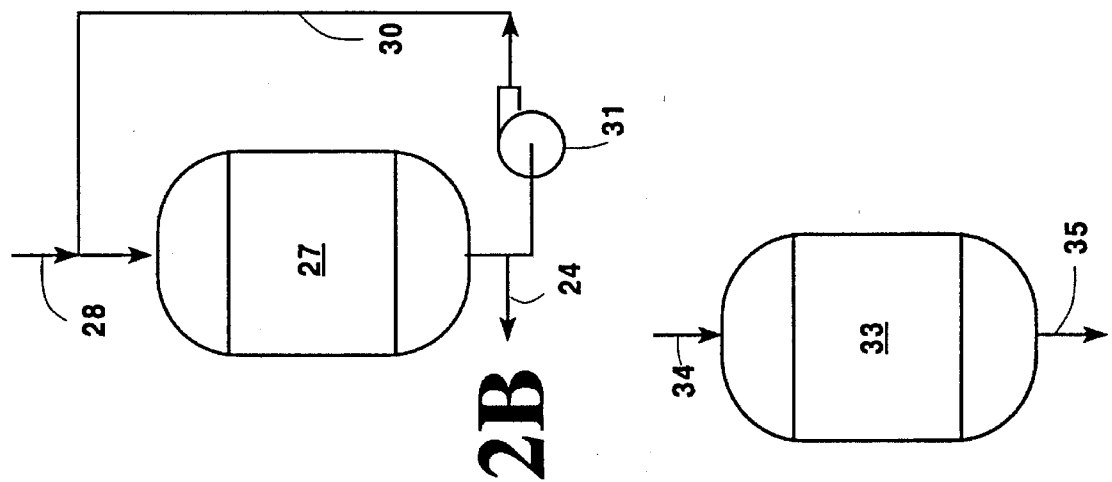
Fig. 2B
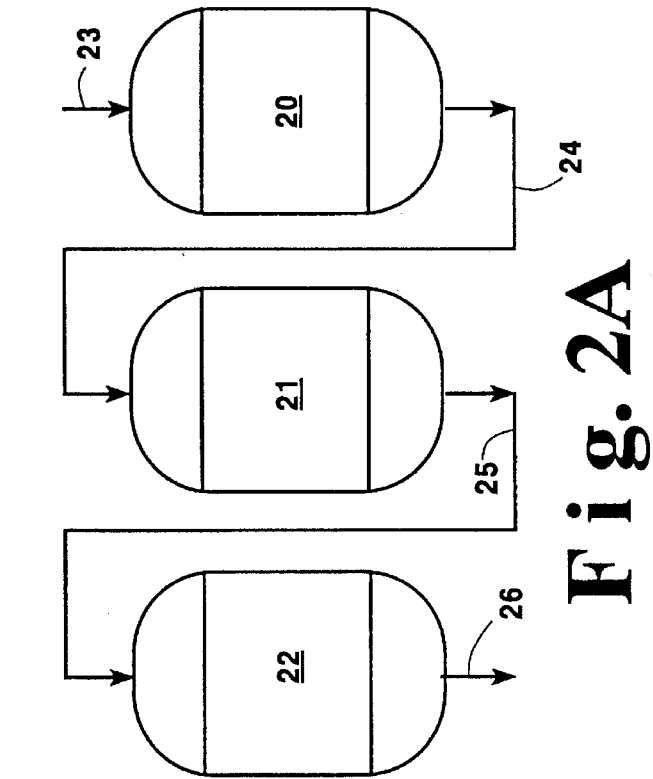
Fig. 2A
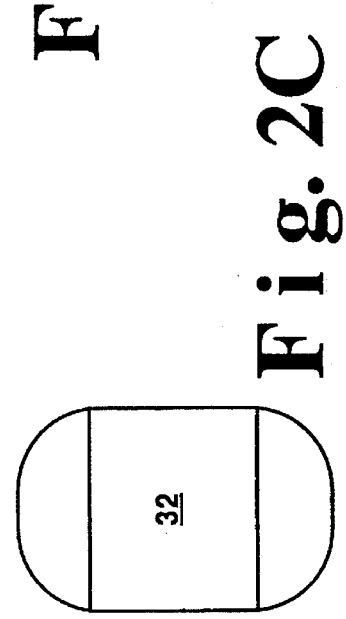
Fig. 2D
Fig. 2C

PROCESS FOR PRODUCING MIXED-CATION ZEOLITES

BACKGROUND OF THE INVENTION

1. Field of the Invention

The invention relates to gas separation adsorption operations. More particularly, it relates to a process for producing mixed-cation zeolitic adsorbents for use in such adsorption operations.

2. Description of the Prior Art

Synthetic zeolite molecular sieves are used commercially as adsorbents in pressure swing adsorption (PSA) processes for the separation and purification of glass. Such materials, e.g. 13X and 5X materials, are complex aluminosilicates that have open framework structures that present a large, effective surface for the adsorption of small gas molecules. The positive charge deficiency due to the presence of aluminum in tetrahedral sites is compensated by the presence of alkaline or alkaline earth ions. The compensating ion is typically $Na^+$, but the open nature of the structure makes the ions accessible to ion exchange with other cations in aqueous solution.

For the production of nitrogen by PSA-air separation processes, it has been found that zeolites containing $Li^+$ ions, or mixtures of $Li^+$ ions with alkaline earth cations such as $Ca^{++}$ or $Mg^{++}$, have particularly desirable properties. The Chao et al. patents, U.S. Pat. Nos. 5,174,979 and 5,413,625, disclose such mixed zeolites and the use thereof in gas separation operations. $Li^+$ zeolites are prepared from the corresponding $Na^+$ zeolites by ion exchange. Thus, a concentrated aqueous solution of $Li^+Cl^-$ is passed through a column containing the $Na^+$ zeolite. The $Na^+$ ions are displaced by the $Li^+$ ions to produce the desired $Li^+$ zeolite. Since zeolites generally have a greater affinity for the $Na^+$ ion than for the $Li^+$ ion, a considerable quantity of strong $Li^+Cl^-$ solution is required, and the spent liquor from this exchange contains a high concentration of both $Na^+$ and $Li^+$ ions. The lithium contained in the spend liquor is too valuable to waste and must be recovered from the spent liquor in practical commercial operations.

The production of multi-cation, or mixed cation, zeolites, such as LiCaX or LiMgX, particularly when trace amounts of $Ca^{++}$ or $Mg^{++}$ are desired, presents operating difficulties. The zeolite has a much greater affinity for the alkaline earth ions than for $Li^+$. To incorporate traces of $Ca^{++}$ into a bed of $Li^+$ zeolite by equilibration with a solution requires the passage of a very large quantity of very dilute $Ca^{++}$ solution through the bed. This approach is generally impractical in commercial operations. If a smaller quantity of solution, with a higher concentration of $Ca^{++}$, is passed through a bed of $Li^+$ zeolite, the $Ca^{++}$ will displace the $Li^+$ from the entrance end of the bed, and the resulting ion-exchanged bed will have a non-uniform distribution of cations therein. As such a non-uniform bed distribution is not desirable for PSA operations, an alternative process is desired in the art for producing multi-cation zeolites.

Synthetic zeolites are usually made with a single species of cation, typically $Na^+$ as indicated above. In the changing of the cations in a zeolite by the displacing of the original cations on the zeolite with other desired cations, the salt solution containing the desired cations is passed through a bed of zeolite at a particular concentration and flow rate depending on the different affinities of the different cations. The progress of the ion exchange operation depends on the concentration and flow rate of the ion exchange solution through the zeolitic bed. To produce a mixed-cation zeolite, the solution can be prepared with cation salt concentrations that are in equilibrium with the desired concentrations of cations in the zeolite. Unfortunately, this process is not practical when the exchange affinities of the cations are very different, as they are for $Li^+$ and $Ca^{++}$. As indicated above, this process would require a very large quantity of solution that is highly concentrated in $Li^+$ and very dilute in $Ca^{++}$.

The preparation of zeolites, and the properties of zeolites exchanged with both $Li^+$ and $Ca^{++}$ or $Si^{++}$, has been described in the Chao et al. patents referred to above. The $Li^+$ zeolite is first prepared, on a laboratory scale, and divalent cations are then added in a solution containing a concentration of divalent cations that is much higher than the desired final equilibrium concentration, but with the total quantity of divalent cations being close to that desired in the final product. For the reasons indicated above, improved processing techniques are desired for large-scale, commercial production operations.

While it is relatively easy to displace all or nearly all of the $Li^+$ by divalent ions, i.e. $M^{++}$ ions, which are strongly taken up by the zeolite, it is much more difficult to obtain a uniform product, particularly one containing a minor fraction of $M^{++}$ in addition to $Li^+$. The divalent cations are quickly taken up by the zeolite that is first contacted, i.e. at the feed end of the bed, thus leading to a non-uniform product as indicated above. The problem of mixed cation zeolite bed non-uniformity is one for which further development in the adsorption field is desired.

It is an object of the invention, therefore, to provide an improved process for the production of mixed-cation zeolites.

It is another object of the invention to provide a process for the production of mixed-cation zeolites with reduced loss of valuable cations.

It is a further object of the invention to provide a process for the production of a uniform bed of mixed-cation zeolites.

With these and other objects in mind, the invention is hereinafter described in detail, the novel features thereof being particularly pointed out in the appended claims.

SUMMARY OF THE INVENTION

An ion-exchange solution containing the desired divalent cation is rapidly recirculated through a zeolite bed having a shallow depth so that all of the zeolite adsorbent pellets or beads are exposed to the divalent cation, which rapidly attaches to the zeolite. The amount of solution employed is reduced, resulting in less loss of valuable cations such as $Li^+$. The solutions employed are far from equilibrium concentrations, but nevertheless produced the desired compositions of cations in the zeolite. An extended period of time, during which the zeolite soaks in a $Li^+$-rich brine produced during the process, allows the ion concentrations to equilibrate and become uniform throughout the zeolite beads and the adsorbent bed. A uniform product of the desired mixed-cation composition is obtained thereby. The invention is generally carried out in a batch process rather than a continuous countercurrent process, resulting in less breakage and loss of fragile zeolite pellets or beads.

BRIEF DESCRIPTION OF THE DRAWINGS

The invention is hereinafter described in detail with reference to the accompanying drawings, not drawn to scale, in which:

FIG. 1C is a schematic drawing illustrating Step 3, i.e. Equilibration, of said embodiment of the invention; and FIG. 1D is a schematic drawing illustrating Step 4, i.e. wash and dry, of said embodiment of the invention; and FIG. 2A is a schematic drawing illustrating Steps 1, 2 and 3, relating to Li/Na exchange, for producing mixed-cation zeolites in a five adsorbent bed embodiment of the invention;

FIG. 2B is a schematic drawing of Step 4, i.e. Ca injection and brine recycle, of said latter embodiment of the invention;

FIG. 2C is a schematic drawing of Step 5, i.e. equilibration, of said latter embodiment of the invention; and FIG. 2D is a schematic drawing of Step 6, i.e. wash and dry, of said latter embodiment of the invention.

DETAILED DESCRIPTION OF THE INVENTION

The objects of the present invention are accomplished by first converting the original $Na^+$ zeolite pellet or bead material to the $Li^+$ form and then converting only the outer regions of the zeolite pellets or beads to the $Ca^{++}$ (or $M^{++}$) zeolite. The original zeolite material is disposed in a relatively shallow bed during this conversion process so that the transit time for the passage of ion-exchange solution through the zeolite material in one pass is quite short. A concentrated $Li^+$ solution is passed through the shallow bed during the first step, thereby establishing a mass transfer zone in the bed, wherein the zeolite is converted to the $Li^+$ form as in conventional ion-exchange processing. When this transfer zone has passed through the bed from the feed end and reached the discharge end thereof, thus completing the $Li^+$ exchange step, the flow pattern is changed, and the tail brine from the first step is recirculated through the bed.

In the second step, a short pulse of a relatively concentrated solution of $Ca^{++}$ is injected into the tail brine stream rapidly recirculating through the shallow bed. During this second step, only the outer regions of the pellets or beads become rapidly converted to the $Ca^{++}$ zeolite. After the $Ca^{++}$ injection, the recirculation of the $Li^+$-rich tail brine is stopped, and the zeolite is allowed to soak in the said $Li^+$-rich tail brine for an extended period of time. During this period of time, the $Ca^{++}$ cations diffuse within the pellets or beads, and the bed attains a uniform composition. For any desired zeolite composition, corresponding solution concentrations are employed, as may be routinely determined for particular embodiments of the invention.

The cations described herein are integral and essential parts of the zeolite structures of the invention. Such cations contribute significantly to establishing the adsorptive properties of the zeolites. It should be noted that when the cations are dry, they are immobile. In the presence of ionic solutions, however, these cations are capable of exchange with the cations present in solution.

In the exchange process, using lithium and sodium ions, it has been found that X-type zeolite employed had an affinity for $Na^+$ present in the untreated zeolite that is about five times that for $Li^+$. This means that a high concentration of $Li^+$ in solution must be used to drive the exchange process for the production of $Li^+X$.

Figure 1B:
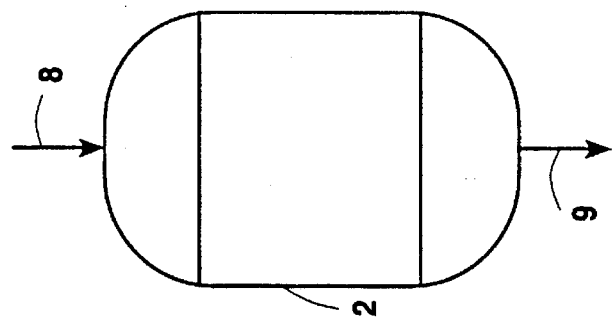
FIG. 1B is a schematic drawing illustrating Step 2, i.e. Ca injection and brine recycle, of said embodiment of the invention.
Figure 1B:
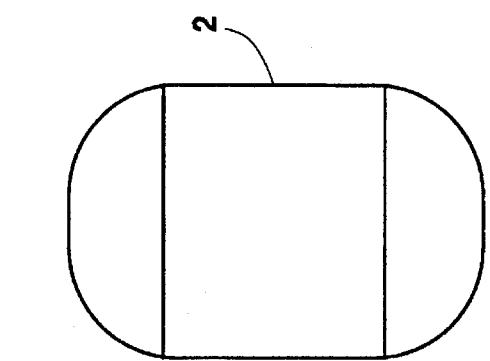
Figure 1A:
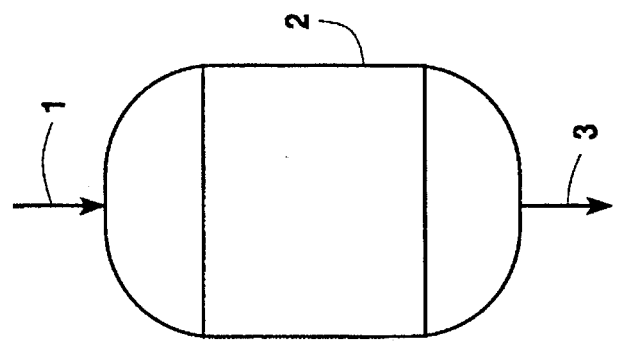
FIG. 1A is a schematic drawing illustrating Step 1, i.e. Li/Na exchange, of the batch process for producing mixed-cation zeolites in a single adsorbent bed embodiment of the invention.

In Step 1 of the invention, shown in FIG. 1A, a concentrated solution of Li Cl or other lithium salt, is passed in line 1 to zeolite bed 2 for passage downward therein. A mass transfer zone is developed in the bed, wherein $Li^+$ ions displace $Na^+$ ions from the zeolite material. This results in the formation of a tail brine that is removed from bed 2 through line 3. It will be appreciated that the total equivalents of $Li^+$ passed through the bed of zeolite must exceed the $Na^+$ displaced from the zeolite in order to attain complete conversion, as evidenced by the complete emergence of the adsorption front of adsorbed Li from the bed. The tail brine removed from the bed will, therefore, contain NaCl, but will also contain a considerable quantity of $Li^+Cl^-$. Techniques have been developed in the art for the recovery of such $Li^+$ for recycle and re-use in the overall process for producing mixed cation zeolites. Such techniques are not, however, an essential feature of the subject invention.

It should be noted that the ion exchange of $Ca^{++}$ for $Li^+$ in the zeolite material is relatively easy to achieve as the $Ca^{++}$ readily displaces the $Li^+$ from the zeolite. A total conversion is readily obtainable, but a partial conversion is more difficult to achieve, particularly if a uniform distribution of cations is desired.

In Step 2 of the invention as illustrated in FIG. 1B of the drawings, the flow of the concentrated LiCl solution is suspended, and a recirculation loop is established, wherein a Li-rich brine is rapidly circulated through recirculation line 4 containing pump 5 for passage downward through bed 2. A pulse containing a determined quantity of $Ca^{++}$ is injected into the recirculating fluid in said loop through Ca injection pulse feed line 6. Excess brine is discharged through line 7. Due to the high flow rate of the Li-rich brine, the $Ca^{++}$ ions are distributed throughout the zeolite bed, where they quickly displace $Li^+$ ions from the outer surfaces of all of the zeolite pellets or beads. The quantity of $Ca^{++}$ ions employed in the pulse is such as to be only slightly more than the amount required in the final product after complete equilibration. In view of the ability of $Ca^{++}$ to readily displace Li+ from the zeolite, essentially all of the $Ca^{++}$ enters the zeolite structure, and little $Ca^{++}$ remains in solution. At the end of this step, however, the ion distribution within the zeolite particles is quite non-uniform.

In Step 3 as shown in FIG. 1C of the drawings, the recirculating flow is stopped, and the particles in zeolite bed 2 are allowed to equilibrate for an extended period of time in the presence of the Li-rich brine. While the diffusion process is slow, the diffusion distances are short, and the process is assisted by the high concentration of $Li^+$ ions that can exchange with and mobilize the $Ca^{++}$ ions on the surface of the zeolite particles. Step 3 is continued until a near equilibrium state is attained.

In Step 4, shown in FIG. 1D of the drawings, bed 2 is washed with water added through line 8 to remove dissolved salts from the bed, with liquid being discharged from the bottom bed 2 through line 9. During this step, some further equilibration will occur until the liquid in the beads becomes very dilute. After such washing, heated air is passed through the bed, for convenience denoted by said line 8, to dry the zeolite beads. Following such drying, and removal of the heated air or other gas, again for convenience denoted by said line 9, the process is complete, and the desired mixed cation zeolite product can be removed from the ion-exchange system.

In the process of the invention as described above, the $Na^+$ zeolite is first converted to $Li^+$ zeolite by ion-exchange with a $Li^+$ solution in Step 1, with the $Li^+$ zeolite then being converted to $Li^+Ca^{++}$ zeolite by a partial ion-exchange with a $Ca^{++}$ solution in Step 2. This order of processing must be maintained for practical processing purposes. Step 1 requires an excess of $Li^+$ because the applicable equilibrium constant is small, and the zeolite has a greater affinity for $Na^+$. If the $Ca^{++}$-exchange were to be conducted first, a much greater excess of $Li^+$ would be needed for the $Li^+$-$Ca^{++}$ exchange, making the overall process much less suitable for practical commercial operations.

In the practice of the invention as described above, the conversion of the $Na^+$ zeolite to $Li^+$ zeolite, as in Step 1 above, is carried out in accordance with conventional procedures. The uniqueness of the process as herein described and claimed relates to the processing feature whereby quantities of alkaline earth ions, such as $Ca^{++}$, are incorporated into the $Li^+$ zeolite.

In an illustrative example of the invention, 3% by equivalents of $Ca^{++}$ were added to a $Li^+$-exchanged bed of X-zeolite spherical beads having the following properties:

| | |
|---|---|
| Zeolite capacity | 6.04 eq. $kg^{-1}$ |
| Particle density | 1160 kq $m^{-3}$ |
| Solid density | 1800 kg $m^{-3}$ |
| Macropore/void fraction | 0.36 |
| Macropore tortuosity | 1.5 |
| External void fraction | 0.32 |
| Particle diameter | 1.83 mm |

The solution used in Step 2 has an initial $Ca^{++}$ concentration of about 556 eq $m^{-3}$, and the bulk diffusivity of $Ca^{++}$ against $Li^+$ is $9 \times 10^{-10}$ $m^2$ $s^{-1}$. For the void fraction and tortuosity above, the diffusivity in the micropores is $2.13 \times 10^{-10}$ $m^2$ $s^{-1}$. A fluid flow rate of 2,000 mol m s pertains, corresponding to a linear velocity of $36 \times 10^{-3}$ m $s^{-1}$.

Since the $Ca^{++}$-ions are very strongly selected by the zeolite, they are rapidly added to the zeolite in a narrow ion-exchange wave that moves from the surface of the particle toward the center of the particle. The limit rate of the exchange can be calculated by assuming that the rate is limited by diffusion of the $Ca^{++}$-ions inward through a film boundary layer and then through a spherical shell of that part of the particle that has already been calcium exchanged. $Li^+$-ions move outward in a counterflow manner. In the limit, the concentration of $Ca^{++}$ drops to zero at the interface between the outer $Ca^{++}$-exchanged shell and the inner $Li^+$-exchanged core.

For the particle size and fluid flow rate above, the film thickness is estimated to be $12 \times 10^{-6}$ m (μm). The mass flow resistivity has been calculated for a radius ratio of 0.99, where the particles would be 3% $Ca^{++}$-exchanged and for a radius ratio of 0.5, where the particles would be 87.5% exchanged with $Ca^{++}$ ions. The resulting resistances to mass transfer are shown in the Table below, which also indicates the rates of diffusion into the particles and into a bed of particles having a 32% void fraction.

TABLE

| Diffusion Rates and Height of a Transfer Unit | | | |
|---|---|---|---|
| Radius ratio $r/r_p$ | 1 | 0.99 | 0.5 |
| Total resistivity s/m | $13 \times 10^3$ | $56 \times 10^3$ | $4.3 \times 10^6$ |
| Rate, eq/$m^2$ particles/s | $43 \times 10^{-3}$ | $10 \times 10^{-3}$ | $0.13 \, 10^{-3}$ |
| Rate, eq/$m^3$ particle/s | 141 | 33 | 0.43 |

TABLE-continued

| Diffusion Rates and Height of a Transfer Unit | | | |
|---|---|---|---|
| Rate, eq/$m^3$ bed/s | 96 | 22 | 0.29 |
| HTU, m | 0.21 | 0.9 | 70 |

The "Height of a transfer unit" (HTU) has been determined by well known chemical engineering concepts and included in the Table. It is observed that the HTU is inversely proportional to the diffusion rate. Thus, when the fluid passes through a bed free of calcium, it is found that the natural logarithm of the $Ca^{++}$ concentration falls by an amount almost equal to the bed length divided by the HTU.

If the zeolite bed contains many HTU's, a vertical gradient in composition will be established wherein the $Ca^{++}$ is high at the feed end and low at the discharge end of the bed. This will lead to a non-uniformly ion-exchanged product, which is not desirable for air-separation adsorption applications. Compositional gradients can be avoided by employing an adsorbent bed that covers a large area, but has a shallow depth, preferably much smaller than the HTU. As the Table shows, this is easier to achieve when a large amount of calcium exchange is desired than when only a minor amount of calcium exchange is desired.

After the initial pulse of concentrated $Ca^{++}$ solution has coated the outer layers of the particles, it is desirable to continue rapidly recirculating the $Li^+$-rich solution to smooth out the vertical gradients in the adsorbent bed.

In a preferred embodiment of the invention, Steps 2 and 3 are carried out in accordance with the following:

(a) Establish a high-flow-rate recirculation of the $Li^+$-rich brine and, if feasible, reduce the fluid temperature to decrease the ion diffusion rates;

(b) Inject a pulse of concentrated $Ca^{++}$-solution, the volume of which contains a total amount of column equivalent to the stoichiometric amount desired in the product. The rapid recirculating flow is maintained during the injection of $Ca^{++}$;

(c) The fluid temperature can be raised above ambient during recirculation of the $Li^+$-rich, $Ca^{++}$-depleted solution, to increase the diffusion rates and enhance the redistribution of all of the ions throughout the particles and the bed; and (d) Suspend the flow, while maintaining the temperature, and allow the zeolite to soak in the $Li^+$-rich electrolyte for an extended period of time, during which the intraparticle diffusion combines to equlibriate the distributions of ions in the zeolite.

The process as described above can be characterized as a "batch" process, as opposed to a continuous process where the zeolite and brine streams are both flowed in a counter-current manner to each other. A "simulated" continuous process can be carried out by adding steps or altering the step durations to form a cyclic process as illustrated in FIG. 2A, FIG. 2B, FIG. 2C, FIG. 2D, FIG. 2E of the drawings. Each zeolite bed goes through all of the steps in sequence. For continuous process, additional steps, not shown, would be employed for loading the zeolite material into a suitable vessel and discharging mixed-cation zeolite product therefrom.

In the process as carried out in the latter embodiment, Steps 3, 2 and 1 are carried out in beds 20, 21 and 22 as shown in FIG. 2A. Thus, feed brine, i.e. LiCl, is introduced to the top of bed 20 through line 23 for Li/Na exchange in Step 3, and the brine solution discharged from the bottom of said bed 20 is passed to the top of bed 21 through line 24 for Li/Na exchange therein in Step 2 of the process. The brine solution removed from the bottom of bed 21 is passed through line 25 to the top of bed 22 for passage therethrough with further Li/Na exchange, and with tail brine, comprising NaCl and LiCl, being discharged through line 26.

In Step 4, as shown in FIG. 2B, a feed brine of $CaCl_2$ is added to the top of bed 27 through line 28 for Ca/Li exchange, with a brine solution being removed from the bottom of said bed 27, and a portion being discharged from the system through line 29 and the remainder being recirculated through line 30, containing pump 31, to the top of said bed 27 for passage therethrough with fresh quantities of feed brine in line 28.

Step 5, illustrated by FIG. 2C, is an equilibration step wherein the recirculating flow is stopped, and the adsorbent particles are allowed to equilibrate for a period of time in the presence of the Li-rich brine in adsorbent bed 32.

The processing cycle is completed by Step 6, illustrated by FIG. 2D, in which first water and then dry air are passed to bed 33 through line 34, with first liquid and then air being withdrawn from bed 33 through line 35.

The process of the invention, as described above, employs a downflow of the indicated solutions through the zeolite bed. The resistance imposed by the bed limits the flow rate that can be employed in Step 2 as shown in FIG. 1B, in which brine is recycled to the top of the zeolite bed 2. Since the flow rate should be as high as practical in order to equitably distribute the $Ca^{++}$ ions, it is desirable, in some embodiments, to employ an upflow of the $Ca^{++}$ solution during this step. The solution fluid would tend to lift, expand and mix the zeolite bed, all of which would lead to a more uniform distribution of the $Ca^{++}$ ions in the bed. In considering the desirability of employing this approach, such benefits thereof need be balanced against the greater particle attrition that would occur during upflow in order to determine which flow pattern is preferable.

It will be appreciated that various changes and modifications can be made in the details of the invention as herein described, without departing from the scope of the invention as set forth in the appended claims. For example, it should be noted that the process of the invention can be used to produce any desired mixed-cation zeolite product, ranging from those containing predominately lithium ions with only a small concentration of calcium ions, i.e. about 2 ppm, to mixed-cation zeolites containing up to 99% calcium ions. As indicated above, it is most difficult to introduce small, trace amounts of calcium ions into a lithium exchanged zeolite material. The invention is, for practical commercial applications, most particularly suited for the preparation of mixed-cation zeolites having from trace amounts, e.g. said about 2 ppm, up to about 25% of calcium exchange.

The mixed-cation zeolites produced in the practice of the invention can be used advantageously in the wide variety of pressure swing adsorption (PSA) processing cycles known in the art, particularly including vacuum pressure swing adsorption (VPSA) processing cycles, with the mixed-cation zeolites preferably comprising containing $Li^+$ ions together with modest amounts of $Ca^{++}$, $Mg^{++}$ or other alkali earth metal ions.

The pulse of $Ca^{++}$ or other such cation injection will be seen from the above to be intended to introduce such cations into the recycle brine and into the adsorbent material as quickly as possible without rupture of the injection lines. The pulse can extend for as short a period of about 2 seconds up to about two minutes or more, depending on the flow rate and other factors pertaining to any particular embodiment.

In this regard, the shallow beds employed in the practice of the invention are most commonly vertical, cylindrical beds having a relatively large diameter and a relatively small depth, although other bed configurations having different cross sectional shapes can also be employed. The depth of the shallow bed, for many applications, will range from about ½ cm to about 2 cm, but can range up to a full meter depending on various factors, such as the particle size of the adsorbent material, which can be as small as about 1½ mm or can range up to about ½ meter to about 2 meters.

The invention represents an important advance in the field of adsorption. It enables relatively uniform mixed cation adsorbents to be produced for use in enhanced pressure swing adsorption operations. The uniform product of desired composition thus produced, particularly at very low levels of $Ca^{++}$ concentration are readily produced with minimized breakage and loss of fragile but valuable zeolite pellets and beads.

I claim:

1. A process for producing mixed-cation zeolites comprising:

(a) passing a concentrated solution of a salt containing a first cation having a lesser affinity than a second cation for a zeolite adsorbent through a bed of said zeolite adsorbent so as to establish a mass transfer zone at the feed end of the bed, wherein said first cation displaces undesired cations present in the zeolite adsorbent therefrom, and to move said mass transfer zone through said bed from the feed end to the discharge end thereof, thereby saturating said bed with said first cation;

(b) recirculating a brine rich in said first cation through said bed and injecting a pulse of said second cation having a greater affinity than said first cation for said zeolite adsorbent into the recirculating brine so as to distribute the second cation through the bed of zeolite adsorbent, said second cation displacing the first cation from the outer surface of the zeolite adsorbent particles throughout the bed, the quantity of the second cation in the pulse being sufficient to provide the desired concentration of the second cation in the mixed-cation zeolite adsorbent;

(c) terminating the recirculation of the brine rich in said first cation through said bed for an equilibration period, thereby enabling the zeolite adsorbent particles to equilibrate in the presence of the first cation-rich brine present in the bed, the presence of a high concentration of the first cation enabling said first cation to exchange with and mobilize the second cation initially present on the surface of the zeolite adsorbent particles, said equilibration period being of sufficient duration to enable a uniform distribution of said first cation and said second cation to occur;

(d) washing the bed of zeolite adsorbent to remove dissolved salts therefrom; and (e) drying the bed of zeolite adsorbent, whereby an essentially uniform mixed-cation product is produced at a concentration of the second cation.

2. The process of claim 1 in which said first cation is $Li^+$ and said second cation is $Ca^{++}$.

3. The process of claim 2 in which the concentration of the second cation in the mixed-cation zeolite is in the range of from about 2 ppm to about 99%.

4. The process of claim 3 in which said concentration of the second cation is from about 2 ppm to about 25%.

5. The process of claim 1 in which said first cation is $Li^+$ and the second cation is $Mg^{++}$.

6. The process of claim 1 in which the quantity of the second cation in the pulse is more than the amount of said second cation desired in the mixed-cation zeolite product.

7. The process of claim 1 in which, in step (d) thereof, the bed of zeolite adsorbent is washed with water.

8. The process of claim 1 in which, in step (e) thereof, the bed of zeolite adsorbent is dried with heated air.

9. The process of claim 1 in which, in step (a) thereof, a concentrated solution of a salt containing said first cation is passed through one or more beds of zeolite adsorbent, while the recirculation of brine is carried out at the same time, in step (b) thereof, in a separate bed of zeolite adsorbent.

10. The process of claim 9 in which, at the same time, the equilibration of step (c), and the washing and drying of step (d) and step (e) thereof, are carried out in separate beds of zeolite adsorbent.

* * * * *